United States Patent
Mortun

(10) Patent No.: US 11,417,984 B2
(45) Date of Patent: *Aug. 16, 2022

(54) WATER RESISTANT POP-UP OUTLET

(71) Applicant: Hubbell Incorporated, Shelton, CT (US)

(72) Inventor: Sorin I. Mortun, Irvington, NY (US)

(73) Assignee: Hubbell Incorporated, Shelton, CT (US)

( * ) Notice: Subject to any disclaimer, the term of this patent is extended or adjusted under 35 U.S.C. 154(b) by 65 days.

This patent is subject to a terminal disclaimer.

(21) Appl. No.: 17/031,075

(22) Filed: Sep. 24, 2020

(65) Prior Publication Data

US 2021/0006008 A1 Jan. 7, 2021

Related U.S. Application Data

(63) Continuation of application No. 16/708,907, filed on Dec. 10, 2019, now Pat. No. 10,797,431, which is a continuation of application No. 16/268,064, filed on Feb. 5, 2019, now Pat. No. 10,505,310, which is a continuation of application No. 15/630,488, filed on Jun. 22, 2017, now Pat. No. 10,218,109.

(60) Provisional application No. 62/353,357, filed on Jun. 22, 2016.

(51) Int. Cl.
| | |
|---|---|
| H01R 13/44 | (2006.01) |
| H01R 13/52 | (2006.01) |
| H02G 3/18 | (2006.01) |
| H01R 24/20 | (2011.01) |
| H01R 25/00 | (2006.01) |
| A47B 21/06 | (2006.01) |
| H01R 103/00 | (2006.01) |

(52) U.S. Cl.
CPC ......... *H01R 13/5202* (2013.01); *H01R 13/44* (2013.01); *H01R 24/20* (2013.01); *H02G 3/185* (2013.01); *A47B 2021/068* (2013.01); *H01R 13/52* (2013.01); *H01R 25/006* (2013.01); *H01R 2103/00* (2013.01)

(58) Field of Classification Search
CPC .... H01R 13/5202; H01R 13/44; H01R 13/52; H01R 24/20; H01R 25/006; H01R 2103/00; H02G 3/185; A47B 2021/068
See application file for complete search history.

(56) References Cited

U.S. PATENT DOCUMENTS

| | | | |
|---|---|---|---|
| 3,622,684 A | 11/1971 | Press | |
| 4,511,198 A * | 4/1985 | Mitchell | H01R 13/44 248/409 |
| 5,575,668 A | 11/1996 | Timmerman | |
| 6,234,812 B1 | 5/2001 | Ivers | |
| 6,756,543 B1 | 6/2004 | Kaloustian | |

(Continued)

*Primary Examiner* — Thanh Tam T Le
(74) *Attorney, Agent, or Firm* — Michael Best & Friedrich LLP

(57) ABSTRACT

A pop-up outlet includes a lower housing configured to receive one or more conductors. A middle housing is connected to the lower housing. An upper housing is moveably connected to the middle housing. An outlet is positioned in the upper housing having an outlet body and at least one receptacle opening. A raise/lower mechanism is configured to move the upper housing with respect to the middle housing from a first position where the outlet body is positioned in the middle housing to a second position where the outlet body is exposed to a user.

20 Claims, 9 Drawing Sheets

(56) References Cited

U.S. PATENT DOCUMENTS

| | | | |
|---|---|---|---|
| 6,854,989 B2 | 2/2005 | Milan | |
| 7,163,409 B1 * | 1/2007 | Chen | H01R 25/006 |
| | | | 439/131 |
| 7,341,463 B2 * | 3/2008 | Lai | H01R 13/512 |
| | | | 174/484 |
| 7,445,513 B1 | 11/2008 | Lee | |
| 7,605,330 B1 | 10/2009 | Black | |
| 7,618,284 B2 | 11/2009 | Lamoureux | |
| 7,626,120 B1 | 12/2009 | Golden | |
| 7,795,544 B2 | 9/2010 | Peck | |
| 8,348,683 B2 * | 1/2013 | Row | H02G 3/12 |
| | | | 439/131 |
| 8,475,186 B1 | 7/2013 | Sikkema | |
| 8,598,453 B2 * | 12/2013 | Hsiao | H02G 3/185 |
| | | | 174/53 |
| 8,723,055 B2 | 5/2014 | Beldock | |
| 10,103,533 B1 * | 10/2018 | Gretz | H02G 3/38 |
| 10,218,109 B2 | 2/2019 | Mortun | |
| 10,367,317 B1 * | 7/2019 | Rahner | H01R 13/506 |
| 10,505,310 B2 * | 12/2019 | Mortun | H01R 24/20 |
| 11,038,298 B2 * | 6/2021 | Makwinski | H01R 9/2408 |
| 11,038,331 B1 * | 6/2021 | Baldwin | H01R 13/447 |
| 11,088,516 B1 * | 8/2021 | Baldwin | H02G 3/081 |

\* cited by examiner

WATER RESISTANT POP-UP OUTLET

RELATED APPLICATION(S)

This application is a continuation of U.S. application Ser. No. 16/708,907, filed Dec. 10, 2019, which is a continuation of U.S. application Ser. No. 16/268,064, filed Feb. 5, 2019, which is a continuation of U.S. application Ser. No. 15/630,488, filed Jun. 22, 2017, which claims priority to U.S. Provisional Application Ser. No. 62/353,357, filed Jun. 22, 2016, the disclosures of which are incorporated herein by reference in their entirety and to which priority is claimed.

FIELD

Various exemplary embodiments relate to pop-up outlets.

BACKGROUND

In certain environments, electrical outlets are exposed to water and other liquids that can enter the outlet and cause electrical shorts. One example of such an environment is in a home kitchen. Kitchen outlets are typically placed vertically above or below the horizontal surface of a countertop so that any water or liquid situated on that horizontal countertop surface would be incapable of penetrating the outlet. In certain spaces, however, it is impractical or impossible to mount an outlet on a vertical surface and the outlet must be mounted on a horizontal surface.

SUMMARY

According to an exemplary embodiment, a pop-up outlet includes a lower housing configured to receive one or more conductors. A middle housing is connected to the lower housing. An upper housing is moveably connected to the middle housing. An outlet is positioned in the upper housing having an outlet body and at least one receptacle opening. A raise/lower mechanism is configured to move the upper housing with respect to the middle housing from a first position where the outlet body is positioned in the middle housing to a second position where the outlet body is exposed to a user. A seal is positioned around the outlet body and having an interior chamber receiving the outlet body.

According to another exemplary embodiment, a pop-up outlet includes a lower housing configured to receive one or more conductors. A middle housing is connected to the lower housing. An upper housing is moveably connected to the middle housing. An outlet is positioned in the upper housing having an outlet body and at least one receptacle opening. A raise/lower mechanism is configured to move the upper housing with respect to the middle housing from a first position where the outlet body is positioned in the middle housing to a second position where the outlet body is exposed to a user. A cap is connected to the upper housing through a snap-fit connection.

According to another exemplary embodiment, a pop-up outlet includes a lower housing configured to receive one or more conductors. A middle housing is connected to the lower housing. A terminal block includes an upper portion in communication with the middle housing and a lower portion in communication with the lower housing. The upper portion of the terminal block includes a strain relief member. An upper housing is moveably connected to the middle housing. An outlet is positioned in the upper housing having an outlet body and at least one receptacle opening. A raise/lower mechanism is configured to move the upper housing with respect to the middle housing from a first position where the outlet body is positioned in the middle housing to a second position where the outlet body is exposed to a user.

BRIEF DESCRIPTION OF THE DRAWINGS

The aspects and features of various exemplary embodiments will be more apparent from the description of those exemplary embodiments taken with reference to the accompanying drawings, in which.

DETAILED DESCRIPTION OF EXEMPLARY EMBODIMENTS

Various exemplary embodiments relate to a pop-up electrical outlet having, for example, a cylindrical profile. The pop-up outlet can be recessed in a surface, for example a countertop, and raised and lowered as needed. The outlet can be raised and lowered manually, using a biasing mechanism, through a motor and gear assembly, or through another suitable mechanism.

Figure 1:
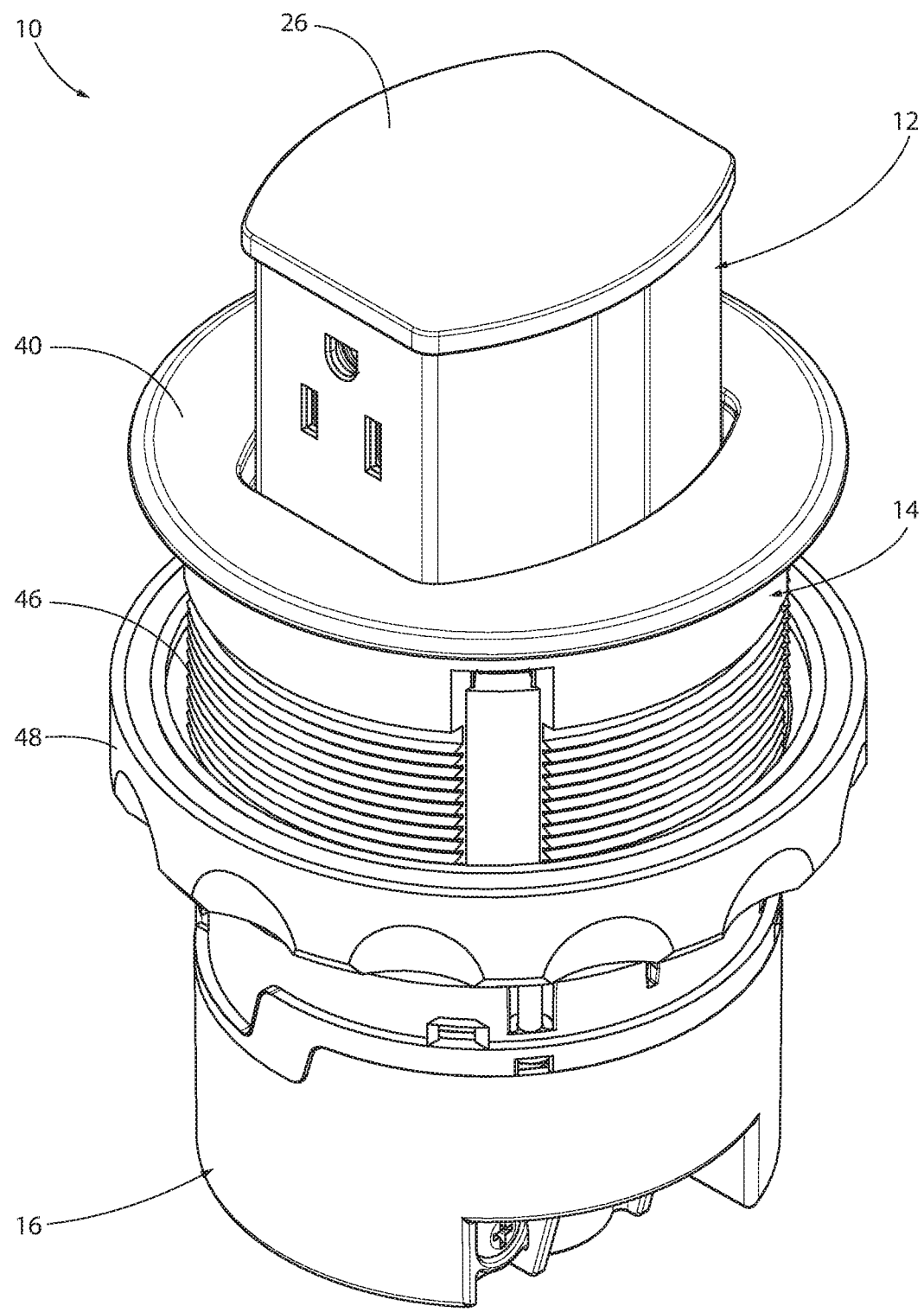
FIG. 1 is a top perspective view of an exemplary pop-up outlet.
Figure 2:
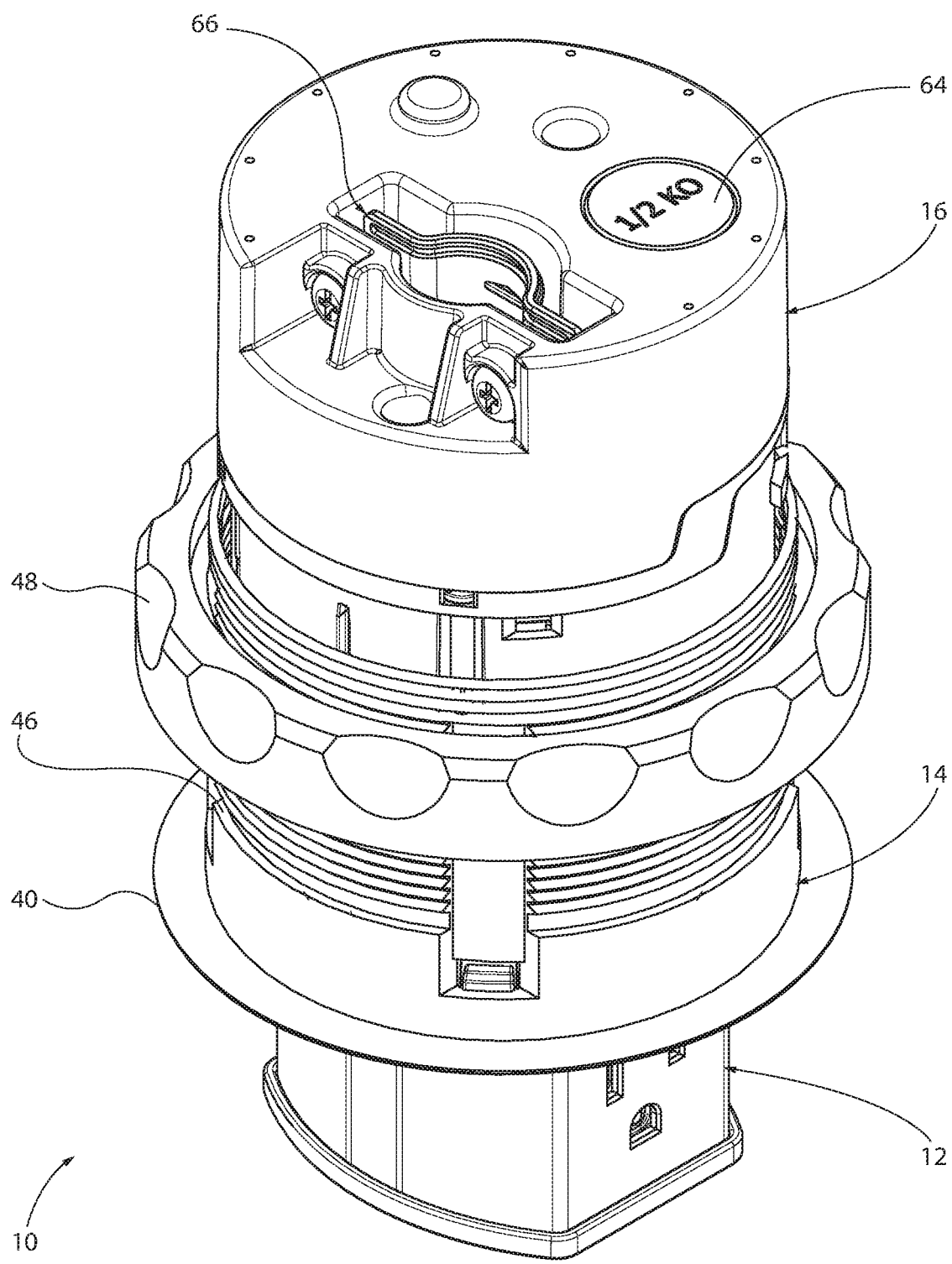
FIG. 2 is a bottom perspective view of FIG. 1.
Figure 3:
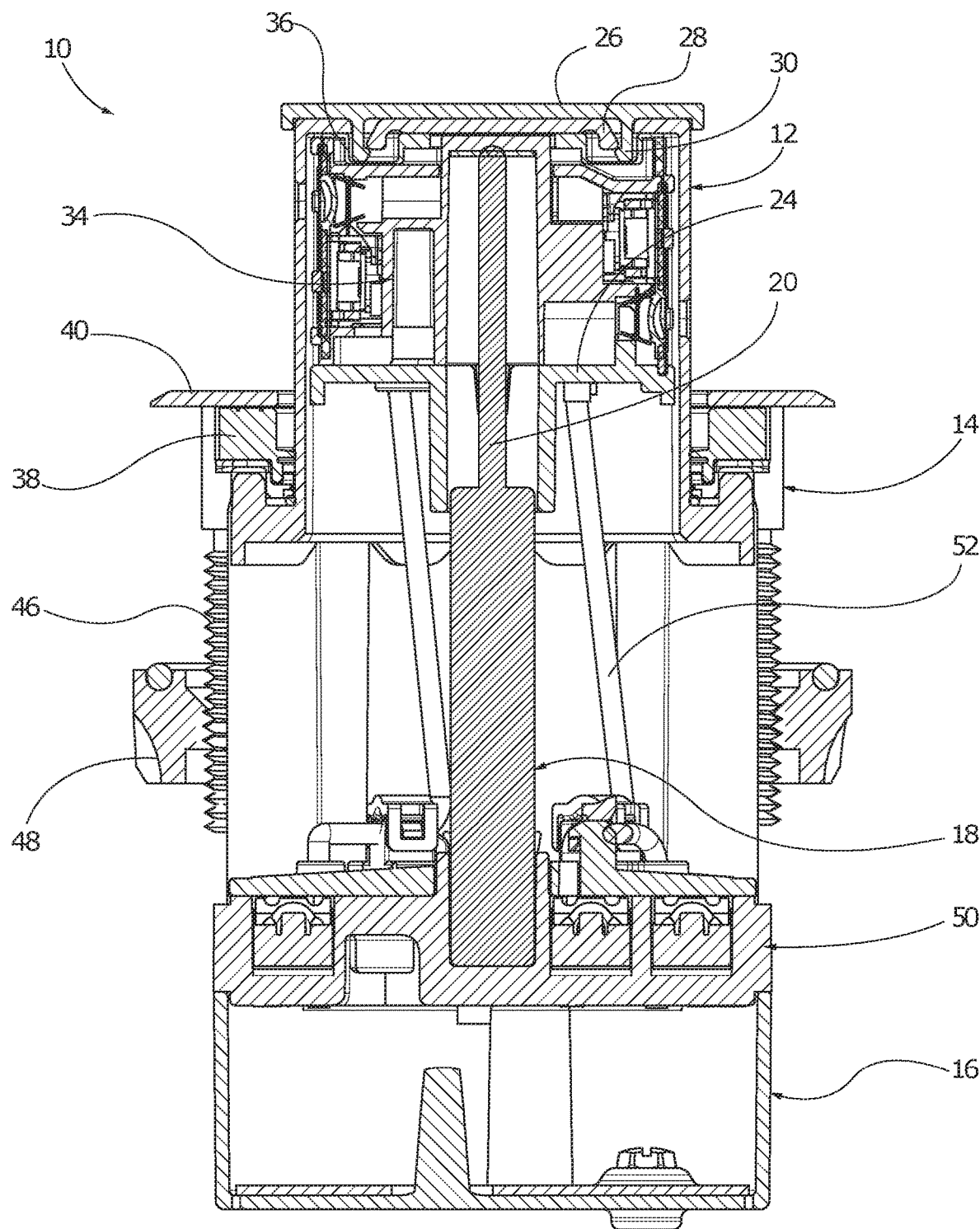
FIG. 3 is a sectional view of FIG. 1.

FIGS. 1 and 2 show an exemplary embodiment of a pop-up outlet 10, having an upper portion including an outlet housing 12, a middle portion including a terminal housing 14, and a lower portion including a wiring housing 16. The outlet housing 12 includes a cavity or chamber for receiving at least a portion of an outlet, the terminal housing 14 includes a cavity or chamber for receiving at least a portion of a terminal device and conductors extending from the terminal device to the outlet, and the wiring housing 16 includes a cavity or chamber for receiving at least a portion of wiring extending from an external source into the pop-outlet.

A raise/lower mechanism 18 extends through the terminal chamber to raise and lower the outlet housing 12 with respect to the terminal housing 14. The raise/lower mechanism 18 includes a translating 20 member that moves between an extended position (as shown) and a retracted position (not shown). The raise/lower mechanism 18 can be completely manual, include a biasing member, or include automated components such as a motor, threads, gears, telescopic members or other components as would be understood by one of ordinary skill in the art.

Figure 4:
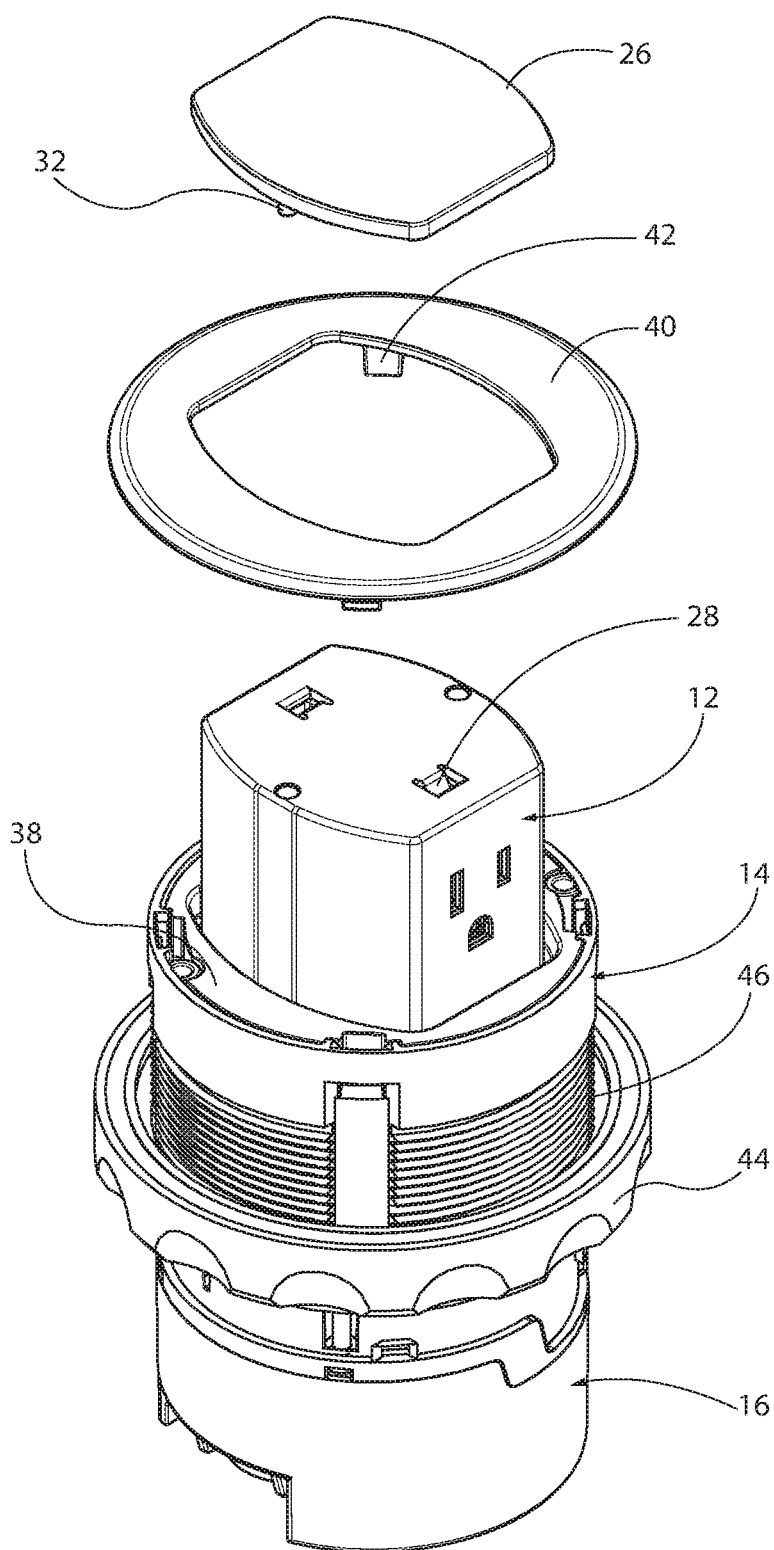
FIG. 4 is partially exploded view of FIG. 1.
Figure 5:
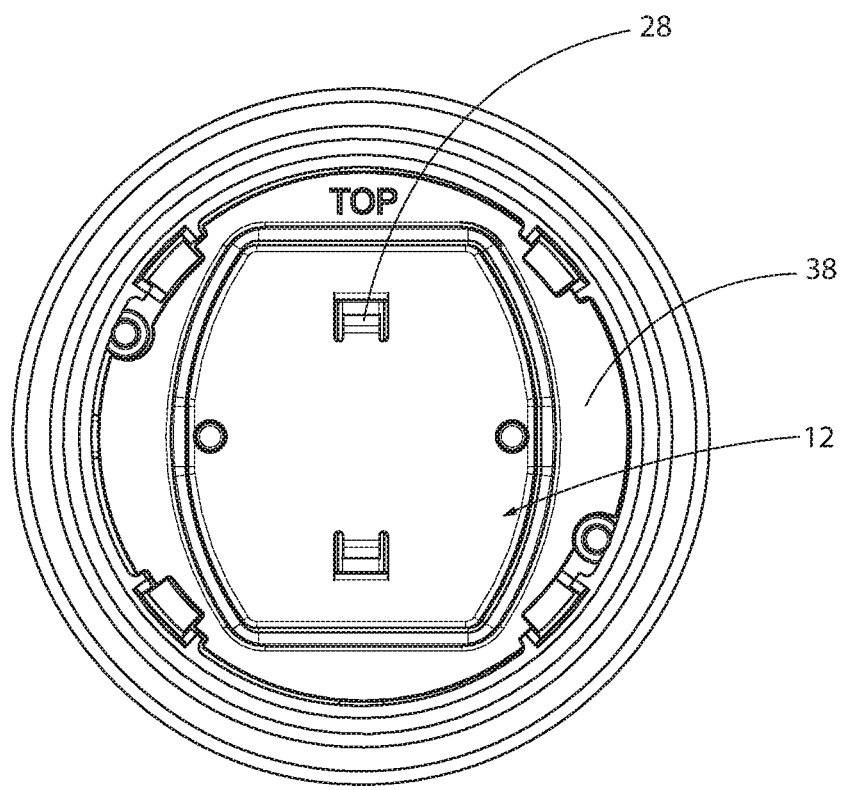
FIG. 5 is a top view of FIG. 1 with the cap and flange removed.
Figure 6:
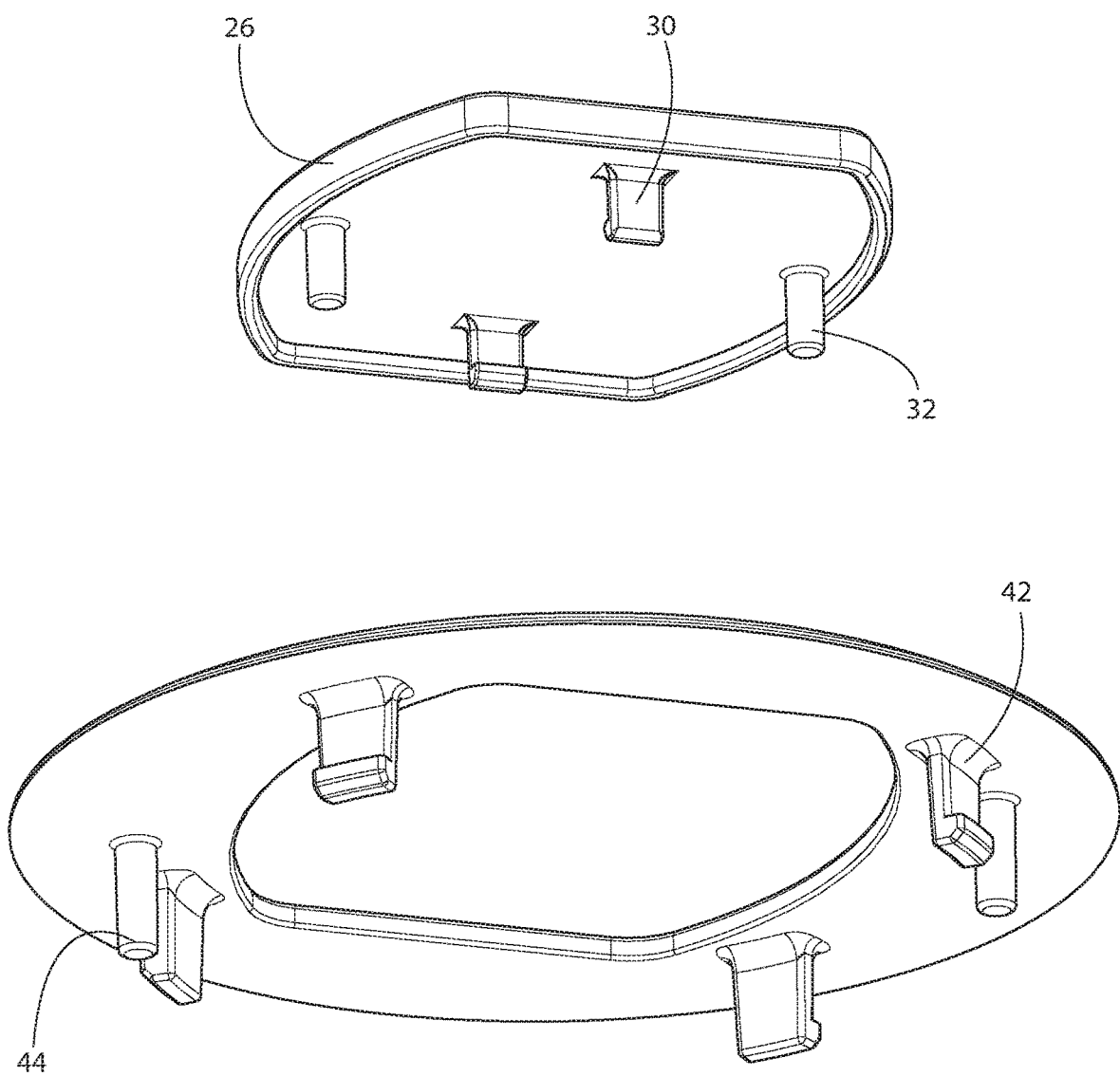
FIG. 6 is a bottom perspective view of the cap and flange.

In various exemplary embodiments, the outlet and a platform 24 are positioned in the outlet housing 12 and a cover 26 is releasably connected to the outlet housing 12, for example through a snap-fit connection. As shown in FIGS. 4-6, the outlet housing 12 includes a first snap-fit connection member and the cover 26 includes a second snap-fit connection member configured to mate with the first snap fit connection member. In an exemplary embodiment, the outlet housing 12 includes first and second openings having a resilient tab 28. The cover 26 includes first and second protrusions 30 that snap-fit into the openings. The protrusions 30 can be cantilever beam having a catch or hook member. The cover 26 can also include one or more posts 32 extending into the outlet housing 12.

The outlet includes an outlet body 34 that is connected to the platform 24, for example through a snap-fit connection. The platform 24 can include one or more openings with a resilient tab that respectively receives one or more flexible prongs from the outlet body. The outlet includes openings for receiving a plug or other type of connector. A three-prong opening having, hot, neutral, and ground receptacles are shown, although the outlet can include a two-prong outlet, a USB outlet, or any other type of electrical connector outlet as would be understood by one of ordinary skill in the art. The outlet will include various other internal components as would be understood by one of ordinary skill in the art.

Figure 7:
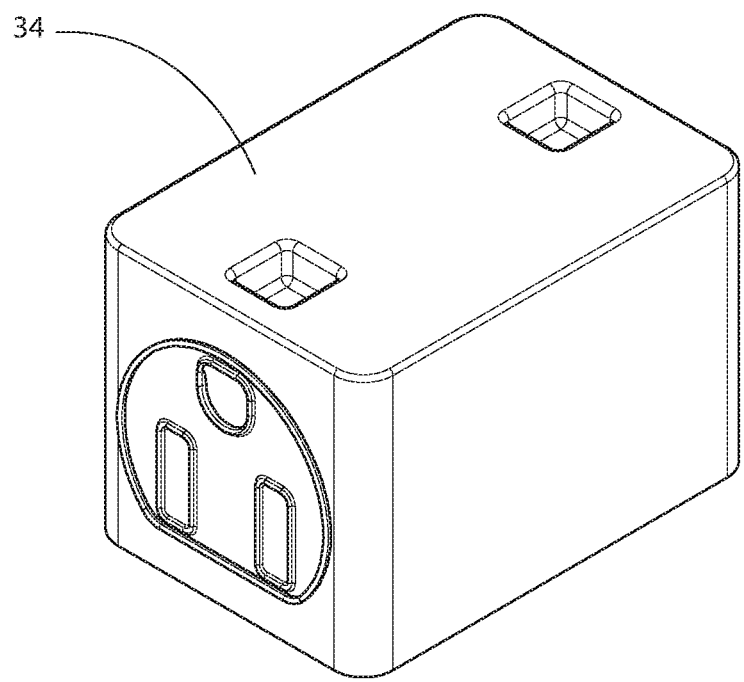
FIG. 7 is a top perspective view of an exemplary seal.
Figure 8:
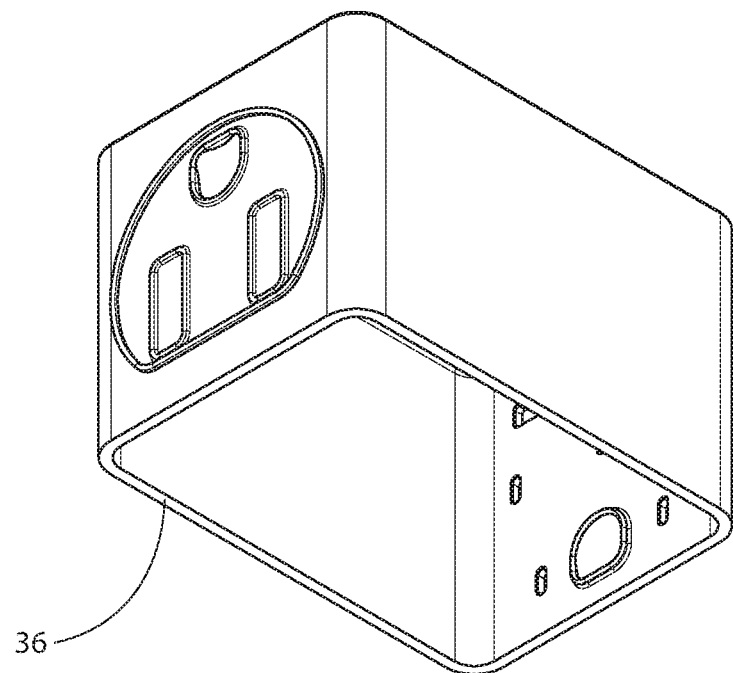
FIG. 8 is a bottom perspective view of FIG. 7.

According to various exemplary embodiments, a gasket or seal 36 is positioned around the outlet body 34 to resist or prevent liquids from entering the outlet body 34 and negatively impacting the electrical components of the outlet. FIGS. 7 and 8 show and exemplary embodiment of the seal 36. The seal 36 covers the front, back, sides and top of the outlet body 34. The seal 36 can include openings or slits (not shown) positioned and sized to align and match the connector openings of the outlet. The slits can be resiliently biased to a closed position, but capable of moving to receive a connector, for example the prongs of a plug.

The terminal chamber includes an upper portion for receiving the outlet housing 12 in the retracted position. An upper plate 38 is connected to the terminal housing 14 and an upper flange 40 is releasably connected to the upper plate 38. As shown in FIGS. 4-6, the upper plate 38 includes a first snap-fit connection member and the flange 40 includes a second snap-fit connection member configured to mate with the first snap fit connection member. In an exemplary embodiment, the flange 40 includes a set of four protrusions 42 that snap-fit into the openings. The protrusions 42 can be cantilever beam having a catch or hook member. The flange 40 can also include one or more posts 44.

An outer surface of the terminal housing includes an outer thread 46. A ring 48 having an inner thread is threadably connected to the outer thread 46. The pop-up outlet 10 can be positioned in a support, such as a countertop, with the flange 40 engaging a top surface. The ring 48 is adjusted and tightened to engage the bottom surface. Adjusting the ring 48 allows the device to be installed in supports having different depths. The ring 48 includes a gasket to create a seal between the ring and the bottom surface of the support.

A terminal block 50 is positioned in the pop-up outlet 10 with a top portion in communication with the terminal chamber and a bottom portion in communication with the wiring chamber. One or more conductors 52 extend from the terminal block 50 to the outlet body 34 to electrically connect the outlet with a power supply.

Figure 9:
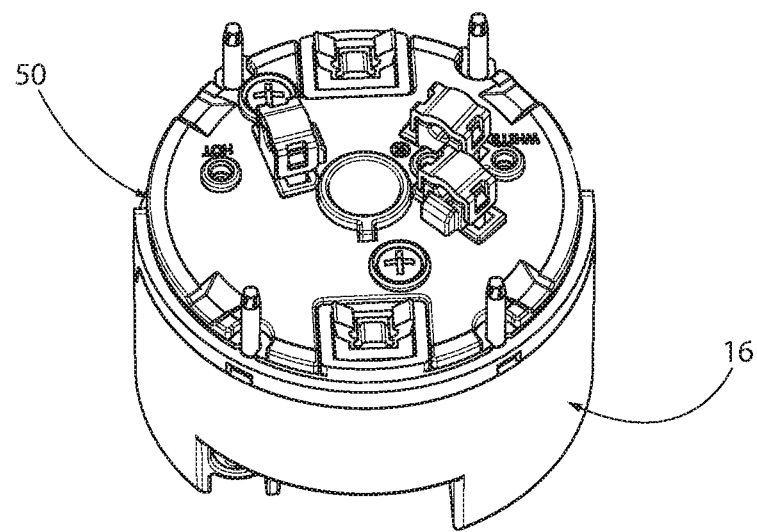
FIG. 9 is a top perspective view of an exemplary terminal block and wiring housing.
Figure 10:
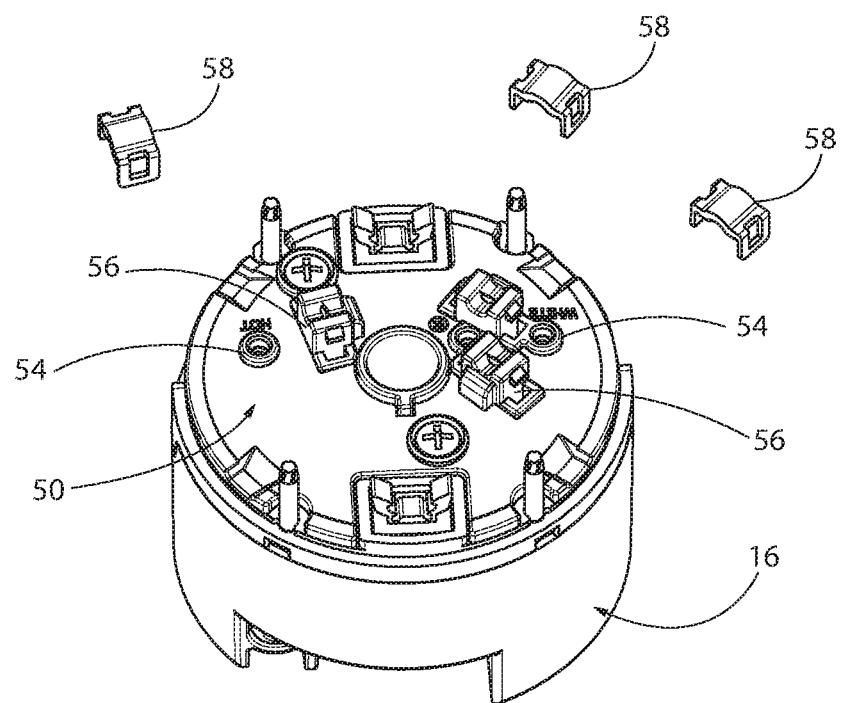
FIG. 10 is a partially exploded view of FIG. 9.

As best shown in FIGS. 9 and 10, the top portion of the terminal block 50 includes a set of openings 54, for example a hot opening, a neutral openings, and a ground opening. The openings are positioned near strain relief members 56. Conductors 52 can extend through the openings 54 and be received in the strain relief members 56. The strain relief members 56 reduce or eliminate strain on the conductors as the outlet is raised and lowered, helping to prevent disconnection of the conductors.

In an exemplary embodiment, the strain relief members include a base 56 and a releasable clip 58. The base 56 includes a channel for receiving the conductors a set of side projections or barbs. The clips 58 include a pair of side openings that receive the barbs in a snap-fit connection.

Figure 11:
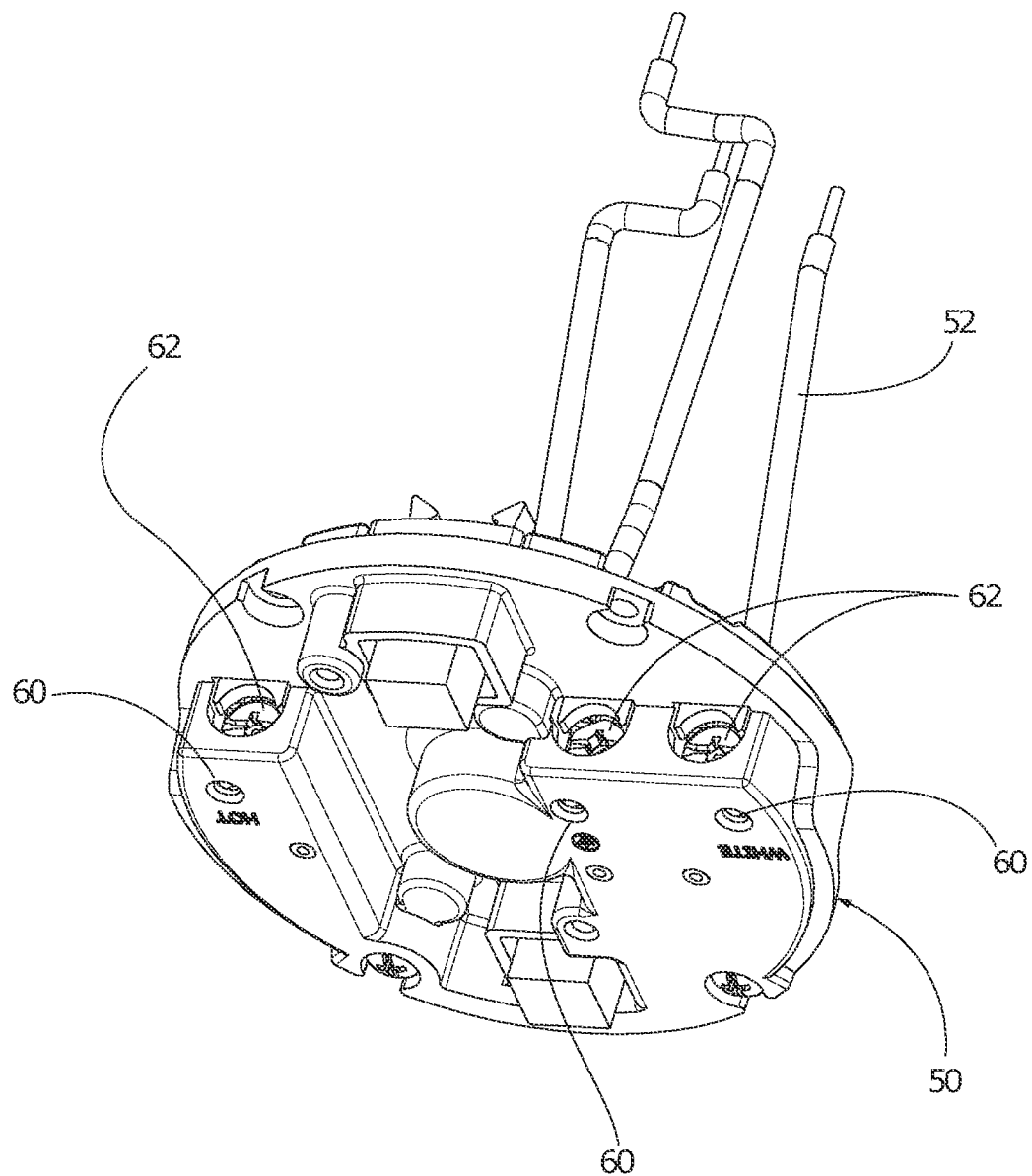
FIG. 11 is a bottom perspective view of the terminal block of FIG. 9.

As best shown in FIG. 11, the lower portion of the terminal block 50 includes a set of wiring terminals, for example a hot, neutral, and ground wiring terminal. The wiring terminals can include an opening 60 positioned orthogonal to a fastener 62, such as a screw, and a moveable plate for clamping an exposed end of a conductor that is inserted into the opening 60. Different types of connections, including crimps and other fasteners can also be used.

As best shown in FIG. 2, the wiring housing includes different passages for receiving different types of power supply conductors or conduits. For example, a knock-out 64 is provided to receive a metallic cable or conduit. A strain relief member 66 having a pair of fasteners and a moveable strain relief plate can be provided for non-metallic cables.

The foregoing detailed description of the certain exemplary embodiments has been provided for the purpose of explaining the general principles and practical application, thereby enabling others skilled in the art to understand the disclosure for various embodiments and with various modifications as are suited to the particular use contemplated. This description is not necessarily intended to be exhaustive or to limit the disclosure to the exemplary embodiments disclosed. Any of the embodiments and/or elements disclosed herein may be combined with one another to form various additional embodiments not specifically disclosed. Accordingly, additional embodiments are possible and are intended to be encompassed within this specification and the scope of the appended claims. The specification describes specific examples to accomplish a more general goal that may be accomplished in another way.

As used in this application, the terms "front," "rear," "upper," "lower," "upwardly," "downwardly," and other orientational descriptors are intended to facilitate the description of the exemplary embodiments of the present disclosure, and are not intended to limit the structure of the exemplary embodiments of the present disclosure to any particular position or orientation. Terms of degree, such as "substantially" or "approximately" are understood by those of ordinary skill to refer to reasonable ranges outside of the given value, for example, general tolerances associated with manufacturing, assembly, and use of the described embodiments.

What is claimed:

1. A pop-up outlet comprising:
   a lower section configured to receive one or more conductors;
   a middle section connected to the lower section, the middle section having a first thread;
   a ring having a second thread connected to the first thread;
   an upper section moveably connected to the middle section, the upper section including a first power transmission member and a second power transmission member, wherein the first power transmission member and the second power transmission member are electrically connected to the one or more conductors;
   a raise/lower mechanism configured to move the upper section with respect to the middle section from a first position where at least one of the power transmission members is positioned at least partially in the middle section to a second position where the at least one power transmission member is exposed to a user.

2. The pop-up outlet of claim 1, further comprising a flange connected to the middle section.

3. The pop-up outlet of claim 1, further comprising a cap connected to the upper section.

4. The pop-up outlet of claim 3, wherein a seal is positioned beneath the cap.

5. The pop-up outlet of claim 3, wherein the cap is snap-fit to the upper section.

6. The pop-up outlet of claim 1, wherein the first power transmission member includes a three-prong opening.

7. The pop-up outlet of claim 6, wherein the second power transmission member includes a USB opening.

8. The pop-up outlet of claim 1, wherein the lower section includes a terminal block having an upper portion in communication with the middle section, the upper portion including a strain relief member.

9. The pop-up outlet of claim 1, wherein the raise/lower mechanism includes a movement member that translates to move the upper section between the first and second position.

10. A pop-up outlet comprising:
- a terminal block configured to receive one or more conductors;
- a middle section connected to a lower section, the middle section having an outer thread;
- a ring having an inner thread connected to the outer thread;
- an upper section moveably connected to the middle section;
- an upper section moveably connected to the middle section, the upper section including a first power transmission member and a second power transmission member, wherein the first power transmission member and the second power transmission member are electrically connected to the terminal block; and
- a raise/lower mechanism configured to move the upper section with respect to the middle section from a first position where the outlet body is positioned at least partially in the middle section to a second position where the outlet body is exposed to a user.

11. The pop-up outlet of claim 10, further comprising a flange connected to the middle section.

12. The pop-up outlet of claim 11, wherein the flange is snap-fit to the middle section.

13. The pop-up outlet of claim 10, wherein a seal positioned to prevent liquid from entering the outlet body when the upper section is in the first position.

14. The pop-up outlet of claim 13, wherein the seal is positioned around the outlet body.

15. The pop-up outlet of claim 13, wherein the seal includes an interior chamber receiving the outlet body.

16. The pop-up outlet of claim 10, wherein the terminal block has an upper portion in communication with the middle housing, the upper portion including a strain relief member.

17. The pop-up outlet of claim 10, wherein the raise/lower mechanism includes a movement member that translates to move the upper section between the first and second position.

18. The pop-up outlet of claim 10, wherein the first power transmission member includes a three-prong opening.

19. The pop-up outlet of claim 18, wherein the second power transmission member includes a USB opening.

20. The pop-up outlet of claim 10, further comprising a cap connected to the upper section.

* * * * *